(12) United States Patent
Grubbs, Jr.

(10) Patent No.: US 10,105,935 B2
(45) Date of Patent: Oct. 23, 2018

(54) REINFORCED STRETCH FILM AND ITS METHOD OF PRODUCTION

(71) Applicant: Alliance Plastics, LLC, Rock Hill, SC (US)

(72) Inventor: Ronald Grubbs, Jr., Charlotte, NC (US)

( * ) Notice: Subject to any disclaimer, the term of this patent is extended or adjusted under 35 U.S.C. 154(b) by 0 days.

(21) Appl. No.: 15/823,366

(22) Filed: Nov. 27, 2017

(65) Prior Publication Data

US 2018/0072024 A1    Mar. 15, 2018

Related U.S. Application Data

(62) Division of application No. 14/261,500, filed on Apr. 25, 2014, now abandoned.

(51) Int. Cl.

| | |
|---|---|
| *B32B 37/00* | (2006.01) |
| *B32B 27/08* | (2006.01) |
| *B32B 7/12* | (2006.01) |
| *B29D 7/00* | (2006.01) |
| *B29C 70/04* | (2006.01) |
| *B32B 37/20* | (2006.01) |
| *B32B 27/32* | (2006.01) |
| *B65B 11/04* | (2006.01) |
| *B65B 23/20* | (2006.01) |

(52) U.S. Cl.
CPC .............. *B32B 27/08* (2013.01); *B29C 70/04* (2013.01); *B29D 7/00* (2013.01); *B32B 7/12* (2013.01); *B32B 27/32* (2013.01); *B32B 37/203* (2013.01); *B32B 2250/242* (2013.01); *B32B 2307/5825* (2013.01); *B32B 2323/046* (2013.01); *B32B 2553/00* (2013.01); *B65B 11/045* (2013.01); *B65B 23/20* (2013.01)

(58) Field of Classification Search
CPC ........... B32B 27/08; B32B 7/12; B32B 27/32; B32B 37/203; B29C 70/04; B29C 65/08; B29D 7/00
USPC ....................................................... 156/73.1
See application file for complete search history.

(56) References Cited

U.S. PATENT DOCUMENTS

| | | | |
|---|---|---|---|
| 6,592,699 B1* | 7/2003 | Mehta .................... | B29C 53/36 156/227 |
| 2002/0182367 A1* | 12/2002 | Salzsauler ............... | B29C 47/00 428/77 |
| 2008/0090045 A1* | 4/2008 | Garegnani ............ | B29C 55/023 428/47 |

(Continued)

*Primary Examiner* — James D Sells
(74) *Attorney, Agent, or Firm* — Blake E. Vande Garde; Erickson Kernell IP, LLC

(57) ABSTRACT

A method of producing a reinforced stretch film includes the steps of: providing an elongated base sheet of plastic stretch film having a longitudinal axis; forming a plurality of cord-like, elongated reinforcement members; positioning the plurality of reinforcement members to the base sheet where the reinforcement members extend along the longitudinal axis of the base sheet; positioning a plurality of plastic film strip overlay over each of the reinforcement members where the overlays being parallel and spaced from one another; and attaching the overlays to the reinforcement members and to the base sheet to fixedly sandwich the reinforcement members between the base sheet and the overlays. Whereby, the reinforcement members comprising parallel, elongated reinforcement strips defining elongated spaces therebetween.

17 Claims, 4 Drawing Sheets

(56) References Cited

U.S. PATENT DOCUMENTS

2008/0113153 A1\* 5/2008 Tiozzo ................ B29C 47/0066
428/114

\* cited by examiner

REINFORCED STRETCH FILM AND ITS METHOD OF PRODUCTION

FIELD OF INVENTION

The instant invention relates to a method for producing plastic film, more particularly reinforced stretch film or plastic films used for stretch wrapping, and even more particularly, reinforced stretch film employed in pallet wrapping and other applications. The invention also encompasses the reinforced stretch film.

BACKGROUND OF THE INVENTION

Stretch films are well known and such films are commonly employed, for example, to wrap goods and products of various types positioned on a pallet, the film wholly or partially covering the goods or products and also typically applied to the pallet itself to secure the pallet to the items positioned thereon. The films themselves are typically made of polyethylene, although other stretch film sheet materials can be employed as well.

To reduce packaging costs, it may be desired to use as little stretch film as possible. In addition, to reduce shipping costs by keeping the shipping weight as low as possible and minimizing the space required for shipping, it may be desired for the film to be as light weight and as thin as possible. However, for obvious safety concerns of both the product being shipped and the humans and equipment used in shipping, stretch films need to have high strength. These problems are all interrelated as typically the less film you use, or the lighter and thinner the stretch film is, the less strength it will have. This is especially true for heavier loads (like bricks, cement blocks, bags, drums, steel tubes, pipes etc.) where stretch films are being continuously wrapped around the pallets to achieve load retention. Currently, the safety concerns are strong enough that the stretch film has to be wrapped with heavier gauge material, like straps, bags or stretch hoods, or an immense amount of film with low pre-stretch is used to keep the heavy product secure. However, both of these options clearly increase packaging and/or shipping costs.

Thus, there is clearly a need to create a light weight thin stretch film that has high strength and can create a high force to load. The instant invention is designed to provide a reinforced stretch film that addresses at least some of the above mentioned problems.

SUMMARY OF THE INVENTION

The instant invention is directed toward a reinforced stretch film and its method of production. The method of producing the reinforced stretch film includes the steps of: providing an elongated base sheet of plastic stretch film having a longitudinal axis; forming a plurality of cord-like, elongated reinforcement members; positioning the plurality of cord-like, elongated reinforcement members to the elongated base sheet where the cord-like, elongated reinforcement members extend along the longitudinal axis of the elongated base sheet; positioning a plurality of plastic film strip overlay over each of the cord-like, elongated reinforcement members where the plastic film strip overlays being parallel and spaced from one another; and attaching the plastic film strip overlays to the cord-like, elongated reinforcement members and to the elongated base sheet to fixedly sandwich the cord-like, elongated reinforcement members between the elongated base sheet and the narrow plastic film strip overlays. Whereby, the narrow plastic film strip overlays and the cord-like, elongated reinforcement members comprising parallel, elongated reinforcement strips defining elongated spaces therebetween.

The reinforced stretch film includes the elongated base sheet and the plurality of elongated reinforcement strips. The elongated base sheet is made of plastic stretch film and has a longitudinal axis. The plurality of elongated reinforcement strips extend along the longitudinal axis of the elongated base sheet, are disposed substantially parallel to one another, and define elongated spaces therebetween. Each elongated reinforcement strip includes: a cord-like, elongated reinforcement member and a narrow plastic film strip overlay. The reinforcement members are attached to the elongated base sheet and extend along the longitudinal axis of the base sheet. Each of the narrow plastic film strip overlays are positioned over the cord-like, elongated reinforcement members thereof. The narrow plastic film strip overlay may be attached to the cord-like, elongated reinforcement member and to the elongated base sheet at opposed sides of the cord-like, elongated reinforcement member to fixedly sandwich the cord-like, elongated reinforcement member between the elongated base sheet and the narrow plastic film strip overlay.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
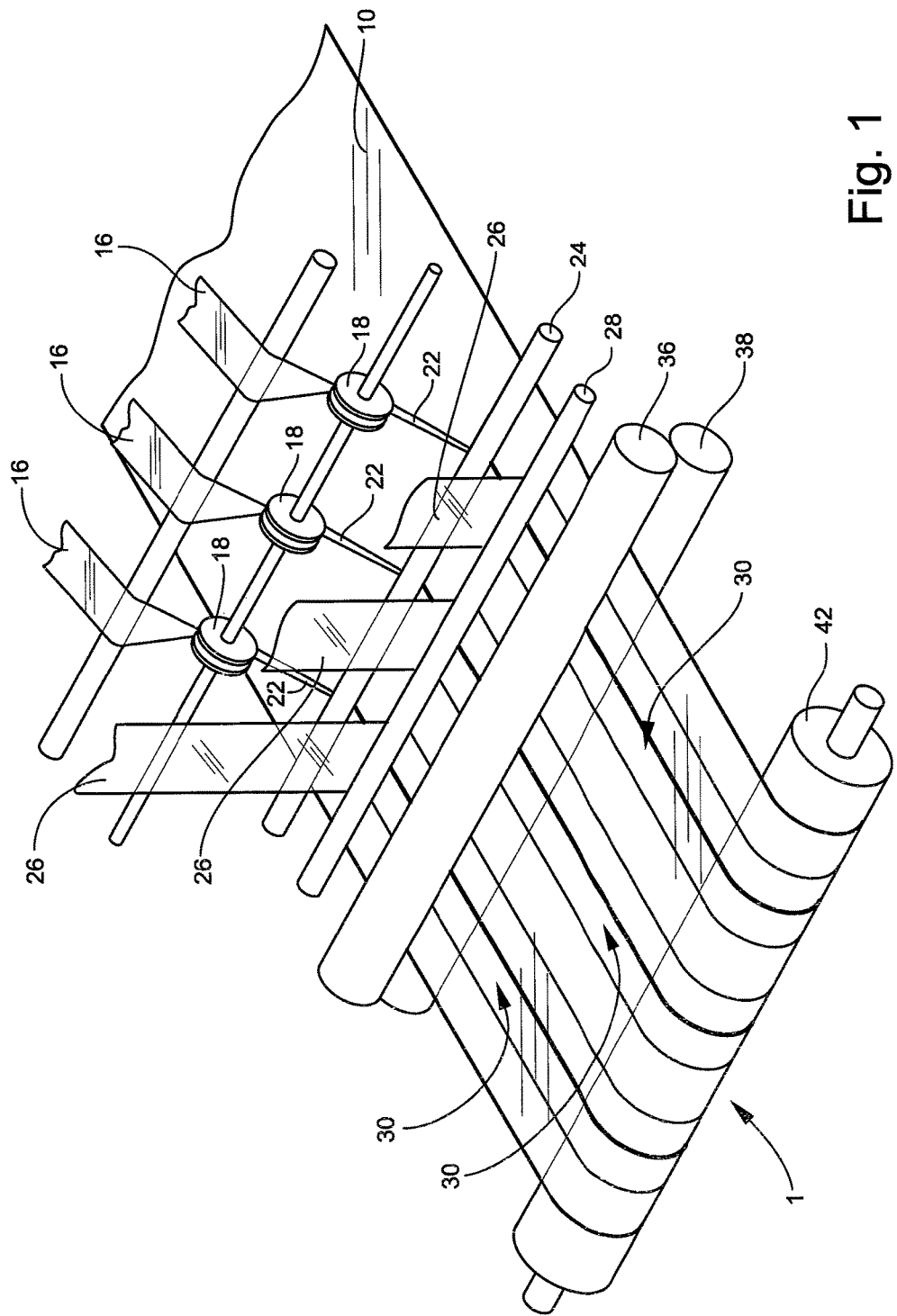
FIG. 1 is a schematic perspective view of one embodiment of an apparatus carrying out one embodiment of the method of the present invention when producing the reinforced stretch film of the instant invention.

Referring to the drawings, wherein like numerals, indicate like elements, there is shown in the Figures an embodiment of a reinforced stretch film 1 (see FIGS. 1-4). Reinforced stretch film 1 may be used for wrapping heavy materials onto a pallet 48. The heavy material may be any material desired to be wrapped on pallet 48, including, but not limited to, heavier pallet materials like bricks, cement blocks, bags, drums, steel tubes, pipes, other similar materials, etc. Reinforced stretch film 1 may provide a high strength, tear resistant stretch film that is capable of securing such heavy materials onto pallet 48. Reinforced stretch film 1 may allow a user to wrap such heavy materials onto pallet 48 safely and securely with less material, weight and space without the need for heavier gauge material, like straps, bags or stretch hoods, or an immense amount of film. Reinforced stretch film 1 may generally be comprised of a base sheet of plastic film 10 and a plurality of reinforcement strips 30 attached to the base sheet 10. These components and the method of producing the reinforced stretch film 1 are discussed in further detail below.

The elongated base sheet 10 may have a longitudinal axis and be made of any suitable material for a stretch film, including any suitable plastic stretch films. See FIGS. 1-4. In one embodiment, the base sheet 10 may be made from a polyethylene material, including, but not limited to linear low-density polyethylene, also known as LLDP. The plurality of reinforcement strips 30 may extend along the longitudinal axis of base sheet 10. In one embodiment, the reinforcement strips 30 may be disposed substantially parallel to one another, and define elongated spaces therebetween. In one embodiment, the base sheet 1 may be uncovered in the spaces defined between reinforcement strips 30.

Each of the elongated reinforcement strips 30 may be made from a reinforcement member 22 and an overlay 26. See FIGS. 1-4. Each of the reinforcement members 22 may be a cord-like, elongated reinforcement member 22 attached to the elongated base sheet 10 and may extend along the longitudinal axis of the elongated base sheet 10. The cord-like reinforcement members 22 may be attached to the base sheet 10 by any means, including, but not limited to, by a plurality of glue bead lines, by static charge, or other like holding means. The reinforcement members 22 may be spaced from one another and parallel. In one embodiment, each of the plurality of cord-like, elongated reinforcement members 22 may be randomly compressed base plastic film strips 16. These base plastic film strips 16 may preferably be flat, narrow plastic film strips that are easily compressed. Each of the overlays 26 may be narrow plastic film strip overlays positioned over the cord-like, elongated reinforcement members 22 thereof. The narrow plastic film strip overlays 26 may be attached to the cord-like, elongated reinforcement members 26 and to the elongated base sheet 10 at opposed sides of said cord-like, elongated reinforcement member 22 to fixedly sandwich the cord-like, elongated reinforcement member 22 between the elongated base sheet 10 and narrow plastic film strip overlay 26. In one embodiment, the base sheet 10 may be completely uncovered in the elongated spaces therebetween the parallel, elongated reinforcement strips 30.

The reinforcement strips 30 may be attached to the base sheet 10 by any means. See FIGS. 1-2. In one embodiment, the narrow plastic film strip overlays 26 may be attached to the cord-like, elongated reinforcement members 22 and to the elongated base sheet 10 by a bond. This bond may be any bond, including, but not limited to: a static electric hold of the plastic film strip overlays 26 to the cord-like, elongated reinforcement members 22 and to the elongated base sheet 10; a lamination bond of the plastic film strip overlays 26 to the cord-like, elongated reinforcement members 22 and to the elongated base sheet 10; and/or an ultrasonic weld of the plastic film strip overlays 26 to the cord-like, elongated reinforcement members 22 and to the elongated base sheet 10. In one embodiment, the bond holding the reinforcement strips 30 to the base sheet 30 may be the combination of a static electric hold of the plastic film strip overlays 26 to the cord-like, elongated reinforcement members 22 and to the elongated base sheet 10, a lamination bond of the plastic film strip overlays 26 to the cord-like, elongated reinforcement members 22 and to the elongated base sheet 10; and an ultrasonic weld of the plastic film strip overlays 26 to the cord-like, elongated reinforcement members 22 and to the elongated base sheet 10

Figure 2:
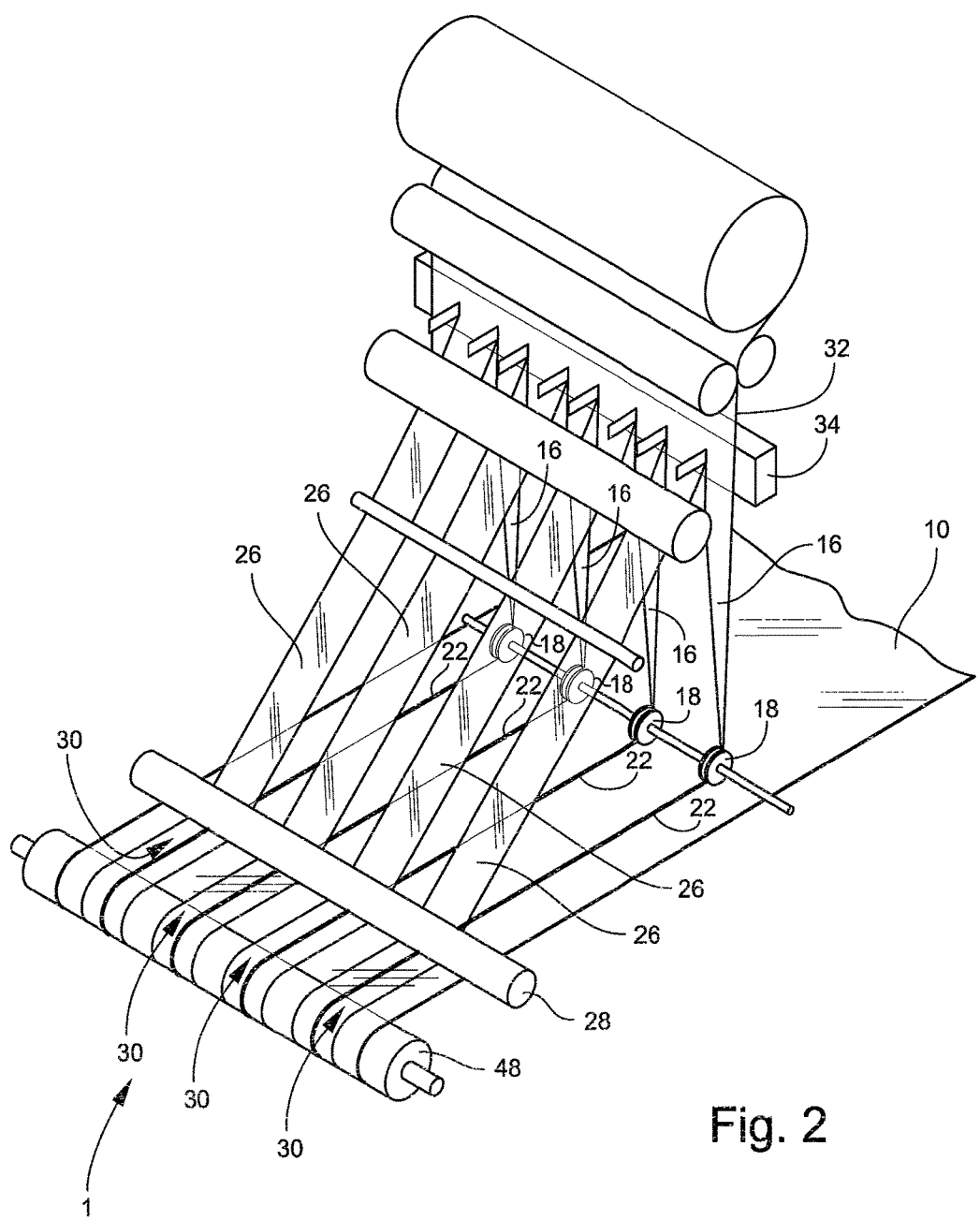
FIG. 2 is a schematic perspective view of one embodiment of an apparatus carrying out one embodiment of the method of the present invention when producing the reinforced stretch film of the instant invention.

Referring to FIGS. 1-2, various embodiments of methods for producing the reinforced stretch film 1 are shown. In general, the method of producing the reinforced stretch film include the steps of: providing the elongated base sheet 10 of plastic stretch film having a longitudinal axis; forming the plurality of cord-like, elongated reinforcement members 22; positioning the plurality of cord-like, elongated reinforcement members 22 on the elongated base sheet 10 where the cord-like, elongated reinforcement members 22 extend along the longitudinal axis of the elongated base sheet 10; positioning a plurality of the plastic film strip overlays 26 over each of the cord-like, elongated reinforcement members 22 where the plastic film strip overlays 26 may be parallel and spaced from one another; and attaching the plastic film strip overlays to the cord-like, elongated reinforcement members and to the elongated base sheet 10 to fixedly sandwich the cord-like, elongated reinforcement members 22 between the elongated base sheet 10 and the narrow plastic film strip overlays 26. Whereby, the narrow plastic film strip overlays 26 and the cord-like, elongated reinforcement members 22 may comprise parallel, elongated reinforcement strips 30 which may define elongated spaces therebetween. In one embodiment, the base sheet 10 may be produced where the spaces defined between the reinforcement strips are completely uncovered.

The method of producing reinforced stretch film 1 may include a step of forming a plurality of cord-like, elongated reinforcement members 22. See FIGS. 1-2. The plurality of cord-like, elongated reinforcement members 22 may include any steps prior to or during the assembly of reinforced stretch material 1 for creating such cord-like elongated reinforcement members 22. In one embodiment, the step of forming the plurality of cord-like, elongated reinforcement members 22 may include randomly compressing a plurality of base plastic film strips 16, which may preferably be flat and narrow, by randomly compressing each of the base plastic film strips 16. This random compression may be done by any random compression means. In one embodiment, the base plastic film strips 16 may be randomly compressed to form cord-like reinforcement members 22 by rotating a collector roll 18. In another embodiment, the base plastic film strips 16 may be randomly compressed to form cord-like reinforcement members 22 by employing a compressor type nozzle during transport thereof. In yet another embodiment, both collector rolls and compressor type nozzles may be desired.

Referring specifically to FIG. 2, in one embodiment the plurality of cord-like, elongated reinforcement members 22 and the plurality of plastic film strip overlays 26 may be formed from a master material 32. The master material 32 may be any suitable stretch film material, including but not limited to, any plastic stretch film material. In one embodiment, the master material 32 may be a polyethylene material, like a linear low-density polyethylene material (LLDP). In the embodiment shown in FIG. 2, the master material 32 may be cut or slit to create the base plastic film strips 16 used for forming the elongated, cord-like reinforcement members 22, and the plastic film strip overlays 26. The master material 32 may be cut or slit, by any means, including, but not limited to, a slitter unit 34 to provide the base film strips 16 of the plurality of cord-like, elongated reinforcement members 22, and the plurality of plastic film strip overlays 26. In this embodiment, the base film strips 16 of the plurality of cord-like reinforcement members 22 and the plurality of film strip overlays 26 are made from the same material and may be the same width. For example, in one embodiment, the master material 32 may be slit by slitter unit 34 at evenly spaced distances to provide base plastic film strips 16 of the plurality of cord-like, elongated reinforcement members 22 and the plurality of plastic film strip overlays 26 of equal widths. However, the widths of the film strips need not be identical and various desired widths of both the base film strips 16 and overlays 26 may be cut or slit out of the master material 32.

Referring back to FIG. 1, in one embodiment the plurality of cord-like, elongated reinforcement members 22 and the plurality of plastic film strip overlays 26 may be formed separately prior to the production of reinforced stretch film 1. In this embodiment, the reinforcement members 22 and overlays 26 may be provided in various suitable stretch film material, including but not limited to, various plastic stretch film material, including various LLDPs.

A step of positioning the plurality of cord-like, elongated reinforcement members 22 to the elongated base sheet 10 may be included in the method of producing the reinforced stretch film 10. The step of positioning the reinforcement members 22 may include any steps for positioning the reinforcement members on base sheet 10. In one embodiment, this step may include attaching the plurality of cord-like, elongated reinforcement members 22 to the elongated base sheet 10, where the cord-like, elongated reinforcement members 22 may be spaced from one another and disposed substantially parallel to one another. In another embodiment, the step of positioning the plurality of cord-like, elongated reinforcement members 22 on the elongated base sheet 10 may include attaching the plurality of cord-like, elongated reinforcement members 22 to the elongated base sheet 10 via a line of adhesive beads and/or a static charge.

A step of attaching the plastic film strip overlays 26 to the cord-like reinforcement members 22 and base sheet 10 may be included in the method of producing the reinforced stretch film 10. This step of attaching the overlays 26 to the reinforcement members 22 and base sheet 10 may include any steps for attaching the overlays 26. In one embodiment, this step may include: a step of holding the plastic film strip overlays onto the cord-like, elongated reinforcement members 22 and to the elongated base sheet 10 via static electricity; a step of laminating the plastic film strip overlays 26 to the cord-like, elongated reinforcement members 22 and to the elongated base sheet 10; a step of sealing the plastic film strip overlays 26 to the cord-like, elongated reinforcement members 22 and to the elongated base sheet 10 via a sonic welder; or combinations thereof. In one embodiment, the step of attaching the overlays 26 to the reinforcement members 22 and base sheet 10 may include a combination of: a step of holding the plastic film strip overlays onto the cord-like, elongated reinforcement members 22 and to the elongated base sheet 10 via static electricity; a step of laminating the plastic film strip overlays 26 to the cord-like, elongated reinforcement members 22 and to the elongated base sheet 10; and a step of sealing the plastic film strip overlays 26 to the cord-like, elongated reinforcement members 22 and to the elongated base sheet 10 via a sonic welder.

FIGS. 1 and 2 show a base sheet of stretch film 10, which may for example suitably be polyethylene stretch film or other like stretch film material, being unrolled from a roll of the film and conveyed toward the left as viewed in FIGS. 1 and 2. Disposed over the base sheet 10 may be a guide roller for guiding the roll of stretch film into the process. First plastic film strips 16, which may also be formed of polyethylene or other suitable material may be conveyed over a guide roller and downwardly to rotating collector rolls 18. First plastic film strips 16 may be flat and narrow. In one embodiment, the first plastic film strips 16 may be made from linear low-density polyethylene, also known as LLDP.

The first film strips 16 may be partially compressed in random fashion by collector rolls 18. In one embodiment, each of the randomly compressed first strips 16 may then be introduced into a compressor nozzle, or other similar device, for further random compression and possible twisting. The first film strips 16 may emerge from rotating collector rolls 18 as cord-like, elongated reinforcement members 22. In one embodiment, reinforcement members 22 may be pushed against the upper surface of base sheet 10 by a first idler roll 24. In one embodiment, reinforcement members 22 may be attached to the upper surface of base sheet 10. Cord-like, reinforcement members 22 may be attached to the upper surface of base sheet 10 by any means. For example, in one embodiment, reinforcement members 22 may be attached to the upper surface of base sheet 10 by a line of adhesive or glue beads, or by a static charge.

Immediately thereafter, plastic film strip overlays 26, which also may be polyethylene or other like material, may be applied to the base sheet 10. Plastic film strip overlays 26 may be flat and narrow. In one embodiment, the plastic film strip overlays 26 may be made from linear low-density polyethylene, also known as LLDP. In one embodiment, plastic film strip overlays 26 may be similar to base plastic film strips 16, including, being cut from the same master material 32. The plastic film strip overlays 26 may be laid over to thereby cover the cord-like reinforcement members 22. The film strip overlays 26 may be on and in engagement with the elongated base sheet 10 on opposed sides of the reinforcement members 22. In one embodiment, a second idler roll 28 may be employed for such purpose and may also establish a firm interconnection between the base sheet 10, the reinforcement members 22, and the narrow film strip overlays 26.

The reinforcement members 22 and the film strip overlays 26 may form any number of elongated reinforcement strips 30 on base sheet 10. In one embodiment, the reinforcement members 22 and the film strip overlays 26 may form three elongated reinforcement strips 30, as shown in the arrangement illustrated in FIG. 1. In another embodiment, the reinforcement members 22 and the film strip overlays 26 may form four elongated reinforcement strips 30, as shown in the arrangement illustrated in FIG. 2. In other embodiments, the reinforcement members 22 and the film strip overlays 26 may form more than four elongated reinforcement strips 30, including, but not limited to 6, 8, 12 or 16 elongated reinforcement strips 30, or any other desired number of reinforcement strips 30. The reinforcement strips 30 may be attached to the base stretch film 10 by an suitable means, including, but not limited to, lamination, static charge, adhesive or heat bonding, sonic welding, the like, combinations thereof, etc. In one embodiment, the reinforcement strips 30 may be attached to the base sheet 10 by first holding the overlays 26 onto the base sheet 10 and reinforcement members 22 with a static charge, then laminating the film strip overlays 26 to the base sheet 10 and reinforcement members 22, and finally sealing the film strip overlays to the base sheet 10 with a sonic welder. The reinforcement strips 30 may be spaced from one another and extend along the longitudinal axis of the elongated base sheet. In one embodiment, the reinforcement strips 30 may be parallel to each other and define spaces therebetween.

Figure 3:
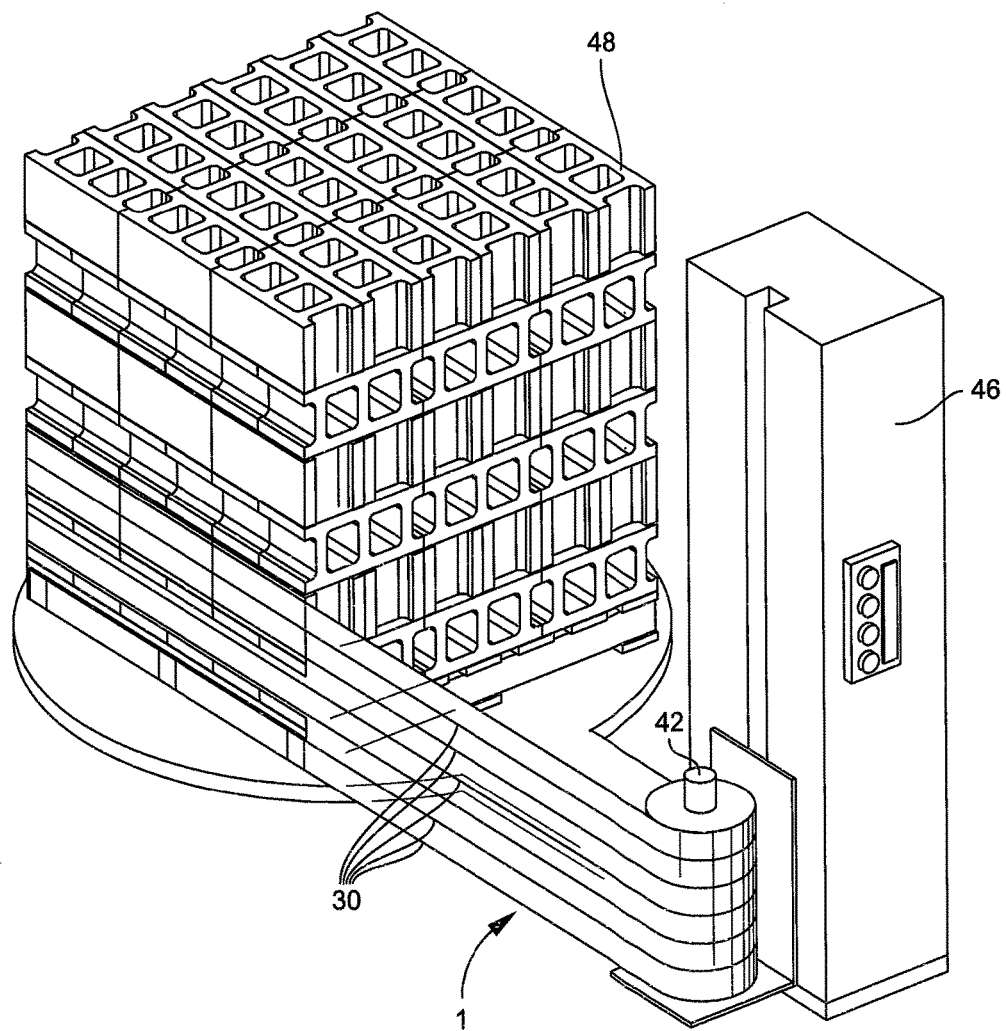
FIG. 3 is an environmental perspective view of one embodiment of the reinforced stretch film being wrapped around a pallet through use of a stretch wrapping machine.
Figure 4:
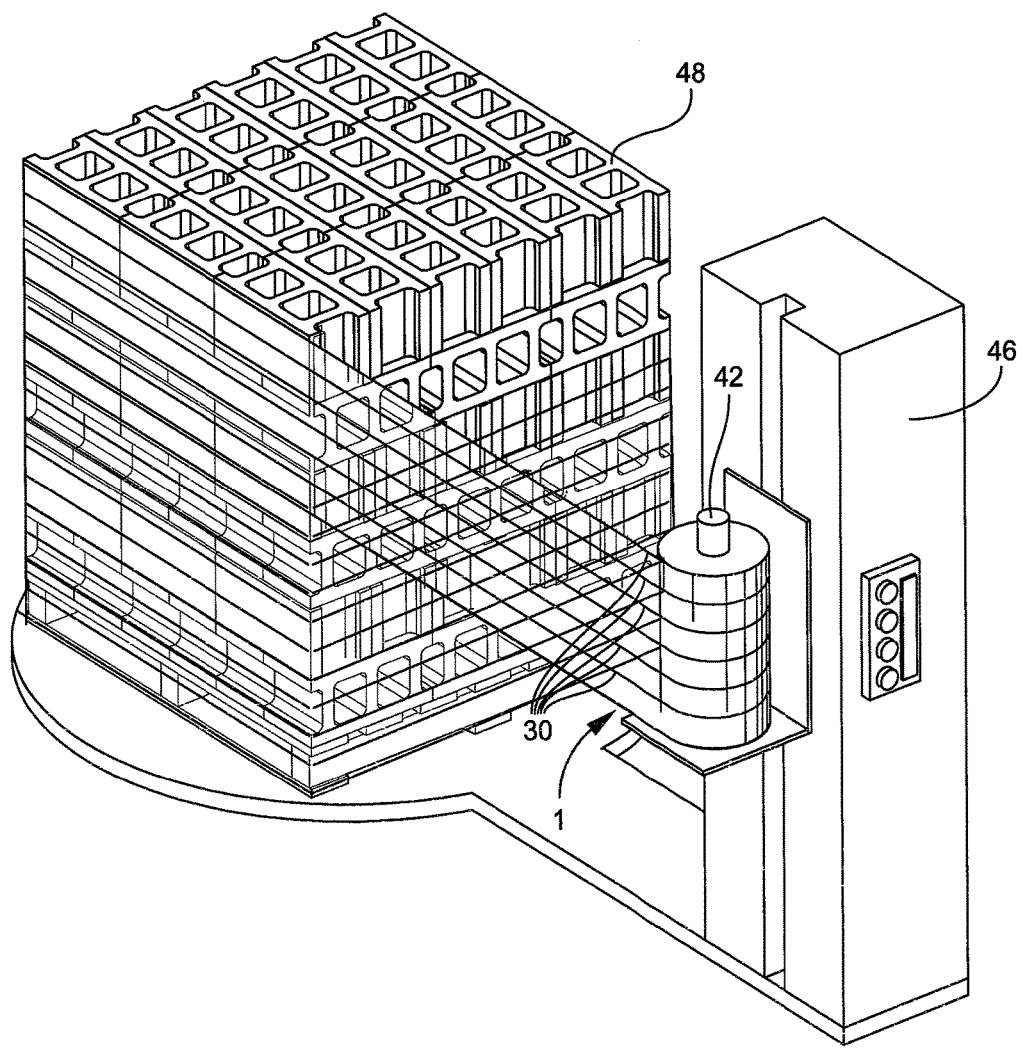
FIG. 4 is another environmental perspective view of one embodiment of the reinforced stretch film being wrapped around a pallet through use of a stretch wrapping machine.

FIGS. 3 and 4 illustrate a roll 42 of the reinforced stretch film 1 being held by a conventional stretch film wrapping machine 46 which may, for example, be a suitable model of stretch film wrapping machine made by Lantech of Louisville, Ky. The stretch film wrapping machine 46 may wrap the reinforced stretch film 1 of the present invention about a pallet load 48.

The reinforced stretch film 1 may provide an increase in the stretch percent over the stretch percent of just providing elongated base sheet of plastic stretch film. In one embodiment, the reinforced stretch film may provide an increase in the stretch percent over the stretch percent of just providing elongated base sheet of plastic stretch film by up to 400 percent. In another embodiment of the present invention, the reinforced stretch film may provide an increase in the stretch percent over the stretch percent of just providing elongated base sheet of plastic stretch film by between 150 and 400 percent. In still another embodiment of the present invention, the reinforced stretch film may provide an increase in the stretch percent over the stretch percent of just providing elongated base sheet of plastic stretch film by between 250 and 400 percent. In yet another embodiment of the present invention, the reinforced stretch film may provide an increase in the stretch percent over the stretch percent of just providing elongated base sheet of plastic stretch film by between 300 and 400 percent.

The present invention may be embodied in other forms without departing from the spirit and the essential attributes thereof, and, accordingly, reference should be made to the appended claims, rather than to the foregoing specification, as indicating the scope of the invention. The invention illustratively discloses herein suitably may be practiced in the absence of any element which is not specifically disclosed herein.

I claim:

1. A method of producing a reinforced stretch film comprising the steps of:
    providing an elongated base sheet of plastic stretch film having a longitudinal axis;
    forming a plurality of cord-like, elongated reinforcement members and forming a plurality of plastic film strip overlays from the same roll which is a roll other than the elongated base sheet;
    randomly compressing and twisting each individual cord-like, elongated reinforcement member which consists of a single section of the roll;
    positioning said plurality of cord-like, elongated reinforcement members on said elongated base sheet where said cord-like, elongated reinforcement members extend along the longitudinal axis of said elongated base sheet;
    positioning a single plastic film strip overlay over each of said cord-like, elongated reinforcement members where each plastic film strip overlay is parallel and spaced from one another; and
    attaching said plastic film strip overlays to said cord-like, elongated reinforcement members and to said elongated base sheet to fixedly sandwich said cord-like, elongated reinforcement members between said elongated base sheet and said narrow plastic film strip overlays;
    whereby, said plastic film strip overlays and said cord-like, elongated reinforcement members are parallel, elongated reinforcement strips which define elongated spaces therebetween comprising only a single layer of the elongated base sheet; and
    wherein the stretch percent of said reinforced film is increased over the stretch percent of said elongated base sheet of plastic stretch film.

2. The method of claim 1 wherein said base sheet is uncovered in said elongated spaces between said parallel, elongated reinforcement strips defined by said narrow plastic film strip overlays and said cord-like, elongated reinforcement members.

3. The method of claim 1 further comprising applying a plurality of glue bead lines for attaching said cord-like, reinforcement members to said base sheet.

4. The method of claim 1 wherein said narrow plastic film strip overlay is attached to the cord-like, elongated reinforcement member and to the elongated base sheet by a bond being:
    a lamination bond of said plastic film strip overlays to said cord-like, elongated reinforcement members and to said elongated base sheet; and
    a static electric seal of said plastic film strip overlays to said cord-like, elongated reinforcement members and to said elongated base sheet.

5. The method of claim 1 wherein the stretch percent of said reinforced film is increased over the stretch percent of said elongated base sheet of plastic stretch film by up to 400 percent.

6. The method of producing a reinforced stretch film of claim 1 wherein said base film strips of said plurality of cord-like, elongated reinforcement members, and said plurality of plastic film strip overlays are made by a slitter unit.

7. The method of producing a reinforced stretch film of claim 1 wherein said master material being slit by a slitter unit at evenly spaced distances to provide said base film strips of said plurality of cord-like, elongated reinforcement members and said plurality of plastic film strip overlays of equal widths.

8. The method of producing a reinforced stretch film of claim 1 wherein said step of attaching said plastic film strip overlays to said cord-like, elongated reinforcement members and to said elongated base sheet to fixedly sandwich said cord-like, elongated reinforcement members between said elongated base sheet and said narrow plastic film strip overlays including the steps of:
    holding said plastic film strip overlays onto said cord-like, elongated reinforcement members and to said elongated base sheet via static electricity;
    laminating said plastic film strip overlays to said cord-like, elongated reinforcement members and to said elongated base sheet;
    sealing said plastic film strip overlays to said cord-like, elongated reinforcement members and to said elongated base sheet via a sonic welder; or
    combinations thereof.

9. The method of producing a reinforced stretch film of claim 8 wherein said step of attaching said plastic film strip overlays to said cord-like, elongated reinforcement members and to said elongated base sheet to fixedly sandwich said cord-like, elongated reinforcement members between said elongated base sheet and said narrow plastic film strip overlays including the steps of:
    holding said plastic film strip overlays onto said cord-like, elongated reinforcement members and to said elongated base sheet via static electricity;
    laminating said plastic film strip overlays to said cord-like, elongated reinforcement members and to said elongated base sheet; and then
    sealing said plastic film strip overlays to said cord-like, elongated reinforcement members and to said elongated base sheet via a sonic welder.

10. A method of producing a reinforced stretch film comprising the steps of:
    providing an elongated base sheet of plastic stretch film having a longitudinal axis;

forming a plurality of cord-like, elongated reinforcement members and forming a plurality of plastic film strip overlays from a roll other than the elongated base sheet;
wherein said plurality of cord-like, elongated reinforcement members are formed by randomly compressing and twisting each individual cord-like, elongated reinforcement member;
positioning said plurality of cord-like, elongated reinforcement members on said elongated base sheet where said cord-like, elongated reinforcement members extending along the longitudinal axis of said elongated base sheet;
positioning a plurality of plastic film strip overlay over each of said cord-like, elongated reinforcement members where said plastic film strip overlays being parallel and spaced from one another; and
attaching said plastic film strip overlays to said cord-like, elongated reinforcement members and to said elongated base sheet to fixedly sandwich said cord-like, elongated reinforcement members between said elongated base sheet and said narrow plastic film strip overlays;
whereby, said narrow plastic film strip overlays and said cord-like, elongated reinforcement members comprising parallel, elongated reinforcement strips defining elongated spaces therebetween.

11. The method of producing a reinforced stretch film of claim 10 wherein said base film strips of said plurality of cord-like, elongated reinforcement members, and said plurality of plastic film strip overlays are made by a slitter unit.

12. The method of producing a reinforced stretch film of claim 10 wherein said master material being slit by a slitter unit at evenly spaced distances to provide said base film strips of said plurality of cord-like, elongated reinforcement members and said plurality of plastic film strip overlays of equal widths.

13. The method of producing a reinforced stretch film of claim 10 wherein said step of attaching said plastic film strip overlays to said cord-like, elongated reinforcement members and to said elongated base sheet to fixedly sandwich said cord-like, elongated reinforcement members between said elongated base sheet and said narrow plastic film strip overlays including the steps of:
holding said plastic film strip overlays onto said cord-like, elongated reinforcement members and to said elongated base sheet via static electricity;
laminating said plastic film strip overlays to said cord-like, elongated reinforcement members and to said elongated base sheet;
sealing said plastic film strip overlays to said cord-like, elongated reinforcement members and to said elongated base sheet via a sonic welder; or
combinations thereof.

14. The method of producing a reinforced stretch film of claim 13 wherein said step of attaching said plastic film strip overlays to said cord-like, elongated reinforcement members and to said elongated base sheet to fixedly sandwich said cord-like, elongated reinforcement members between said elongated base sheet and said narrow plastic film strip overlays including the steps of:
holding said plastic film strip overlays onto said cord-like, elongated reinforcement members and to said elongated base sheet via static electricity;
laminating said plastic film strip overlays to said cord-like, elongated reinforcement members and to said elongated base sheet; and then
sealing said plastic film strip overlays to said cord-like, elongated reinforcement members and to said elongated base sheet via a sonic welder.

15. The method of producing a reinforced stretch film of claim 10 wherein said base sheet being uncovered in said elongated spaces therebetween said parallel, elongated reinforcement strips defined by said narrow plastic film strip overlays and said cord-like, elongated reinforcement members.

16. The method of producing a reinforced stretch of claim 10 further comprising:
transporting the elongated base sheet in a direction of movement corresponding to the longitudinal axis of said elongated base sheet;
said step of forming a plurality of cord-like, elongated reinforcement members being completed simultaneously with the transport of said elongated base sheet;
where each of said cord-like, elongated reinforcement members is made by simultaneously randomly compressing said plurality of transported flat, narrow plastic film strips by randomly compressing each of said flat, narrow plastic film strip by simultaneously rotating said collector roll and employing a compressor nozzle during transport thereof;
said step of positioning said plurality of cord-like, elongated reinforcement members to said elongated base sheet being during transport of said elongated base sheet;
transporting said elongated base sheet and said cord-like, elongated reinforcement members attached thereto in the direction of movement to the longitudinal axis of said elongated base sheet; and
said step of attaching said plastic film strip overlays to said cord-like, elongated reinforcement members and to said elongated base sheet being during transport of said elongated base sheet and said cord-like, elongated reinforcement members attached thereto.

17. The method of claim 10 wherein the stretch percent of said reinforced film is increased over the stretch percent of said elongated base sheet of plastic stretch film by up to 400 percent.

* * * * *